United States Patent [19]

Gagen

[11] Patent Number: 4,636,033
[45] Date of Patent: Jan. 13, 1987

[54] OPTICAL FIBER SPLICE AND METHODS OF MAKING

[75] Inventor: Paul F. Gagen, Duluth, Ga.

[73] Assignee: AT&T Bell Laboratories, Murray Hill, N.J.

[21] Appl. No.: 609,769

[22] Filed: May 14, 1984

[51] Int. Cl.⁴ .............................................. G02B 6/38
[52] U.S. Cl. ................................................. 350/96.21
[58] Field of Search ................ 350/96.15, 96.20, 96.21

[56] References Cited

U.S. PATENT DOCUMENTS 4,186,999  2/1980  Harwood et al. ................ 350/96.21
4,474,423  10/1984 Bisbee et al. ..................... 350/96.15

OTHER PUBLICATIONS

Miller et al; "Low Loss Single Mode Fiber Splices Using UV Curable Cement"; IOOC 1983 Proceedings; 6/83.
Deveau et al; "Low Loss Single Mode Fiber Splices Using UV Curable Cement"; OFC Optical Fiber Comm. Topical Meeting; Mar. 1983; pp. 6-1 to 6-4.

Primary Examiner—William L. Sikes
Assistant Examiner—Robert E. Wise
Attorney, Agent, or Firm—E. W. Somers

[57] ABSTRACT

A low loss optical fiber splice comprises first and second assemblies (52—52) each of which terminates an optical fiber. Each assembly includes a plug (30) that has a passageway (32) extending therethrough with a fiber positioned therein and having an end face (34) extending at least to an end face (36) of the plug. Each plug is received in a housing (59) which has a flange (66) at one end thereof and a bore (64) to allow the fiber to extend therethrough. A collar (68) and a spring (69) are disposed about the housing with the spring engaging the housing and the collar. After a fiber is secured within each plug, the fiber cores (24—24) are aligned with a curable optically matching adhesive material being injected between the end faces thereof. Then the adhesive material is cured to lock the fibers in an aligned position and to secure the plugs together. Afterwards, the collars are moved toward the housing bodies to compress the springs and the flanges are positioned in nests (71—71) of a support frame (54). Then the collars are released whereupon the springs cause the collars to engage the support frame and secure the assemblies thereto. Also, the springs cause compressive forces to be imparted to the interface between the fibers to maintain the splice connection notwithstanding temperature cycling.

15 Claims, 7 Drawing Figures

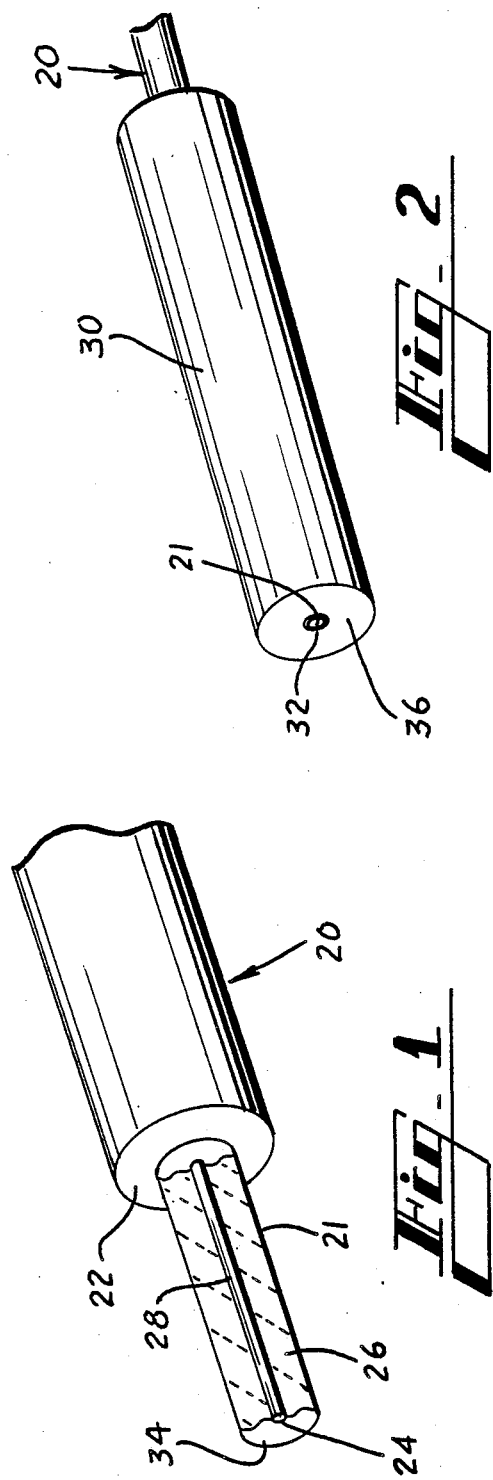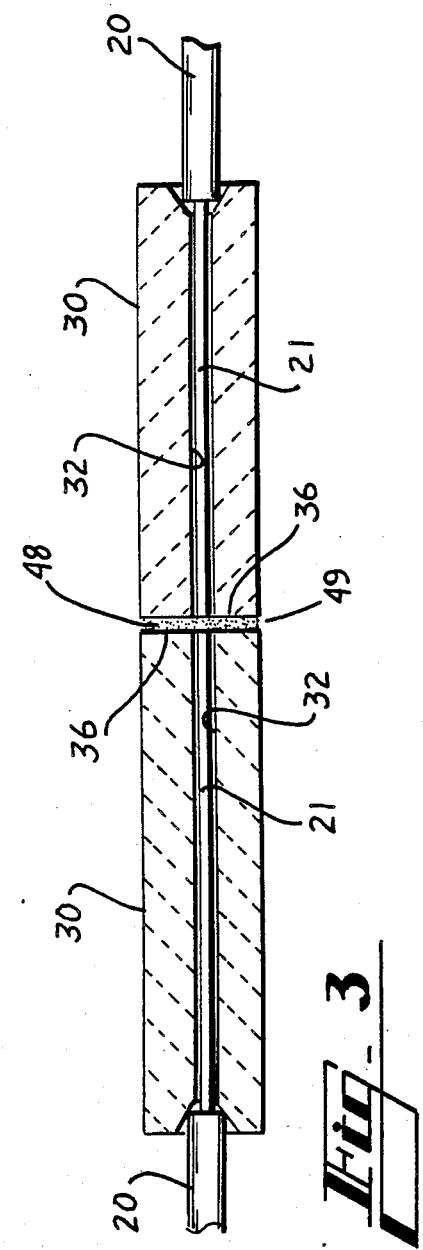

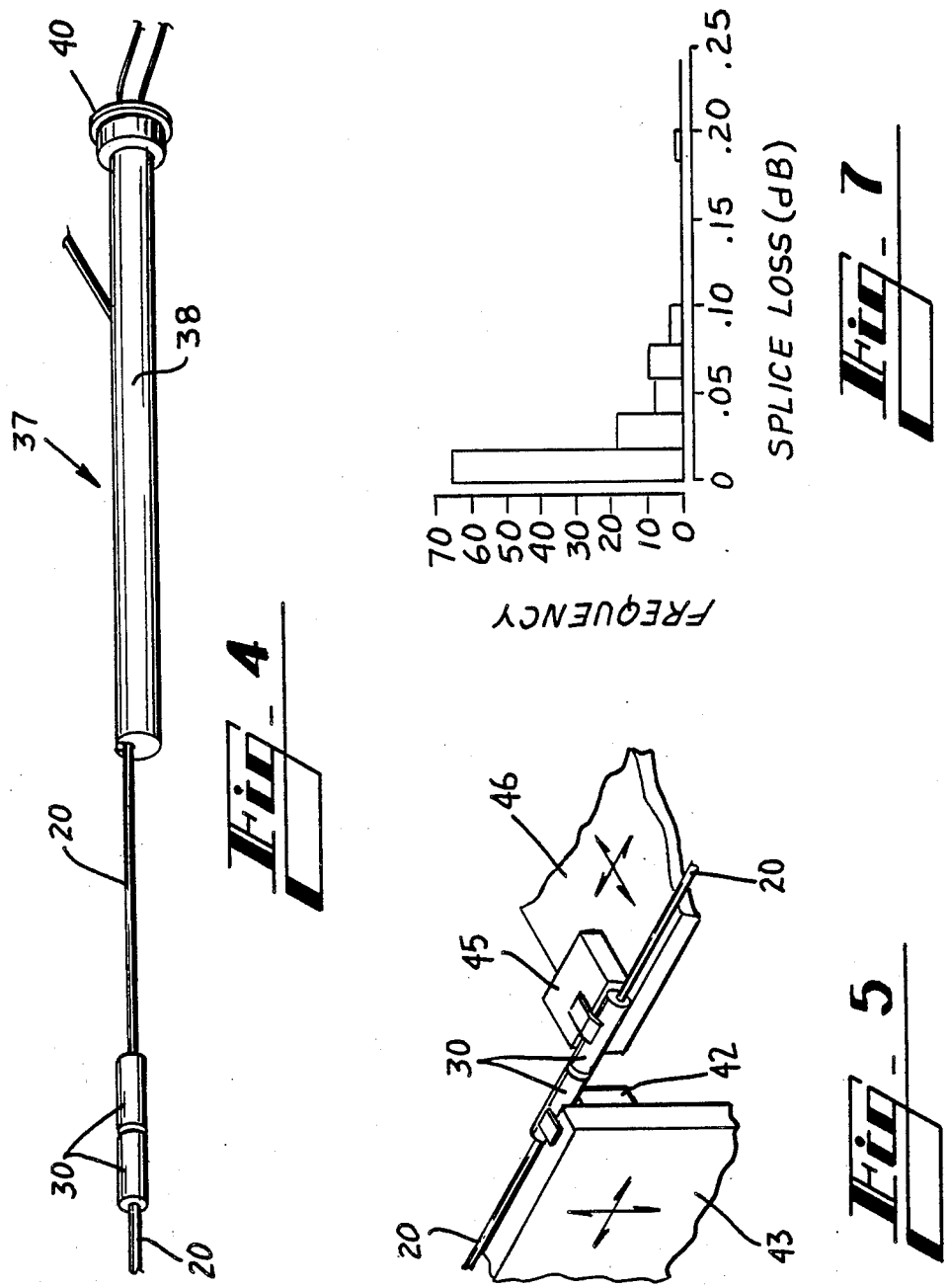

OPTICAL FIBER SPLICE AND METHODS OF MAKING

TECHNICAL FIELD

This invention relates to an optical fiber splice and to methods of making optical fiber splices. More particularly, it relates to an optical fiber splice which is specially suited to single mode optical fibers.

BACKGROUND OF THE INVENTION

The use of optical fiber communication systems has increased significantly during the last few years. It appears likely that the use of this mode of communications will continue to increase in the future. Accordingly, companies involved in this type of communications have sought ways not only to improve the manufacture of optical fibers and cables, but also techniques for providing connections between fiber lengths.

Establishing connections between optical fibers is not a simple task. Typically, an optical fiber includes a core which may be as low as about 8 microns in diameter and a cladding having an outer diameter of about 125 microns. The optical fiber is coated with a material which has an outer diameter of about 250 microns.

Various devices and methods have been developed for connecting two optical fibers. Connectors and splices are two general categories of optical fiber joining techniques. Whereas connectors relate to devices which are capable of repeated connections and disconnections, splices are usually used when a relatively low loss is desired in connecting two optical fibers with the probability of disconnection and reconnection being relatively low.

Currently, there are two general categories of optical fiber splices-fusion splices and mechanical splices. In fusion splices, the ends of two optical fibers are brought together and melted by a flame or electric arc, for example, in order to join the ends. Although the fiber cores may be aligned prior to making the fusion splice, the fusion process may disturb that alignment and cause undesirable splice losses. In mechanical splices, the optical fiber ends are brought together and joined by mechanical means or by an adhesive material. Those splices which are made with an adhesive material are referred to as bonded splices.

Splices are made in both multimode and single mode lightguide fibers. The low loss and high bandwidth of single mode optical fibers promise excellent high capacity long distance communications. However, the relatively small core diameter of single mode fiber makes splicing more difficult than with multimode fibers, and the effects of end quality and transverse and angular misalignment are more critical. Reports of fiber losses as low as 0.35 dB/km at 1.3 $\mu$m, and even less at 1.55 $\mu$m, make low loss splicing techniques important for maximum repeater spacing. For example, if a splice is placed, on the average, every kilometer in a fiber that has an inherent loss of 0.4 dB/km, and if the splice itself adds an additional 0.2 dB loss, the average loss of the spliced fiber will be 0.6 dB/km. However, if the splice loss is reduced to 0.1 dB, the average loss of the spliced fiber would be 0.5 db/km. For a typical single mode optical fiber system, this reduction in loss is estimated to yield an increase in maximum repeater spacing of about 1 to 2 kilometers. Thus, a very significant economic benefit is realized by reducing the splice loss between fibers.

Conventional splicing techniques that rely on the alignment of the outer surface of the fiber cladding achieve relatively low splice losses only for fibers with well-centered cores having an eccentricity of less than 0.5 micron and well-controlled outer diameters. Submicron core centering tolerances cannot always be maintained in large-scale manufacturing; therefore, the splicing of non-identical fibers relying on cladding alignment methods are expected to result in higher losses.

In one technique, two optical fibers having end faces that are substantially flat and substantially perpendicular to the axes of the fibers are placed end-to-end. Next, a slotted tube is placed to surround the ends, and then at least partially filled with an adhesive material, typically ultraviolet (UV) curable adhesive material. The fibers are aligned to produce minimum scattering of radiation directed through the fibers, as measured by a scattering detector, and the adhesive material is cured. Optionally, a sleeve, typically in the form of glass tubing, is then moved over the splice, seated with adhesive material, and cured.

Although the last-mentioned technique has yielded losses typically less than 0.1 dB, the splices may experience a problem caused by the environment. Temperature cycling causes the tube and/or the sleeve to expand and contract. As a result, thermally induced stresses may be imparted by the tube to the fibers and hence to the splice. This may lead to failure of some splices, which would result in interrupted circuits and require repair.

Seemingly, the prior art has not yet dealt with this problem. Nonetheless, it is a problem that must be addressed in order to provide lightguide systems, particularly single mode systems, with the reliability that users have come to expect in the communications industry.

SUMMARY OF THE INVENTION

The foregoing problem has been overcome by the splice of this invention and by the methods of making the splice. The optical fiber splice includes a first plug which includes a passageway formed therethrough. A first optical fiber which is secured in the passageway of the first plug has an end face substantially coplanar with one end face of the plug. The fiber includes a core and a cladding which encloses the core. A second plug also has a passageway formed therethrough and a second optical fiber is secured therein. The second fiber has an end face which is substantially coplanar with one end face of the second plug. The one end face of the second plug is adjacent to the one end face of the first plug and the fiber cores are aligned with each other to reduce loss. A cured optical matching adhesive is disposed between the end faces of the fibers and end faces of the plugs to hold said end faces secured together and to reduce reflective loss between the sliced fibers. Inasmuch as the plugs which are supporting substrates for the fibers do not extend through the interface between the fibers, the application of thermal stresses to the splice is reduced substantially.

In a preferred embodiment, a device for splicing two optical fibers includes first and second assemblies each of which is capable of terminating an optical fiber. Each assembly includes a housing which includes a stem at one end thereof and having a bore formed therethrough for receiving an optical fiber. Also, a body of the housing has an enlarged cavity which opens to another end and which communicates with the bore. The stem has a flanged end opposite to the housing. A collar is disposed slidably about the extension and a compression spring is disposed about the housing betwen the body of the housing and the collar. A glass plug having an optical fiber received and secured within a passageway therethrough is received in the cavity of the housing with the bore in the housing and the passageway in the plug being aligned. A craftsperson aligns approximately the cores of the fibers and then causes a curable adhesive to be disposed between adjacent end faces of the fibers and plugs. The fiber cores are aligned substantially precisely and the adhesive material is cured. The assemblies are caused to be mounted in a support frame having spaced nests. The collar of each assembly is moved toward its associated housing and the flange of that housing is positioned in one of the nests. The collars are released whereupon the springs cause the collars to engage a wall portion of the support frame to hold each assembly in the support frame. Also, the springs of the two assemblies cause forces of a predetermined level to be applied to the joint between the end faces of the fibers to maintain them in compressive engagement with each other. Unlike the prior art, the splice represents a discontinuity in the structure of the splice thereby minimizing the application of thermal stresses to the bonded end faces of the fibers.

BRIEF DESCRIPTION OF THE DRAWINGS

Other features of the present invention will be more readily understood from the following detailed description of specific embodiments thereof when read in conjunction with the accompanying drawings, in which:

FIG. 1 shows an optial fiber prepared for splicing;

FIG. 2 shows an optical fiber terminated with a plug;

FIG. 3 shows an optical fiber splice;

FIG. 4 shows a scattering detector for determining alignment of optical fibers;

FIG. 5 shows an apparatus which is suitable for aligning the fibers during splicing;

FIG. 7 shows a histogram of the splice loss results as measured by a detector.

DETAILED DESCRIPTION

Figure 6:
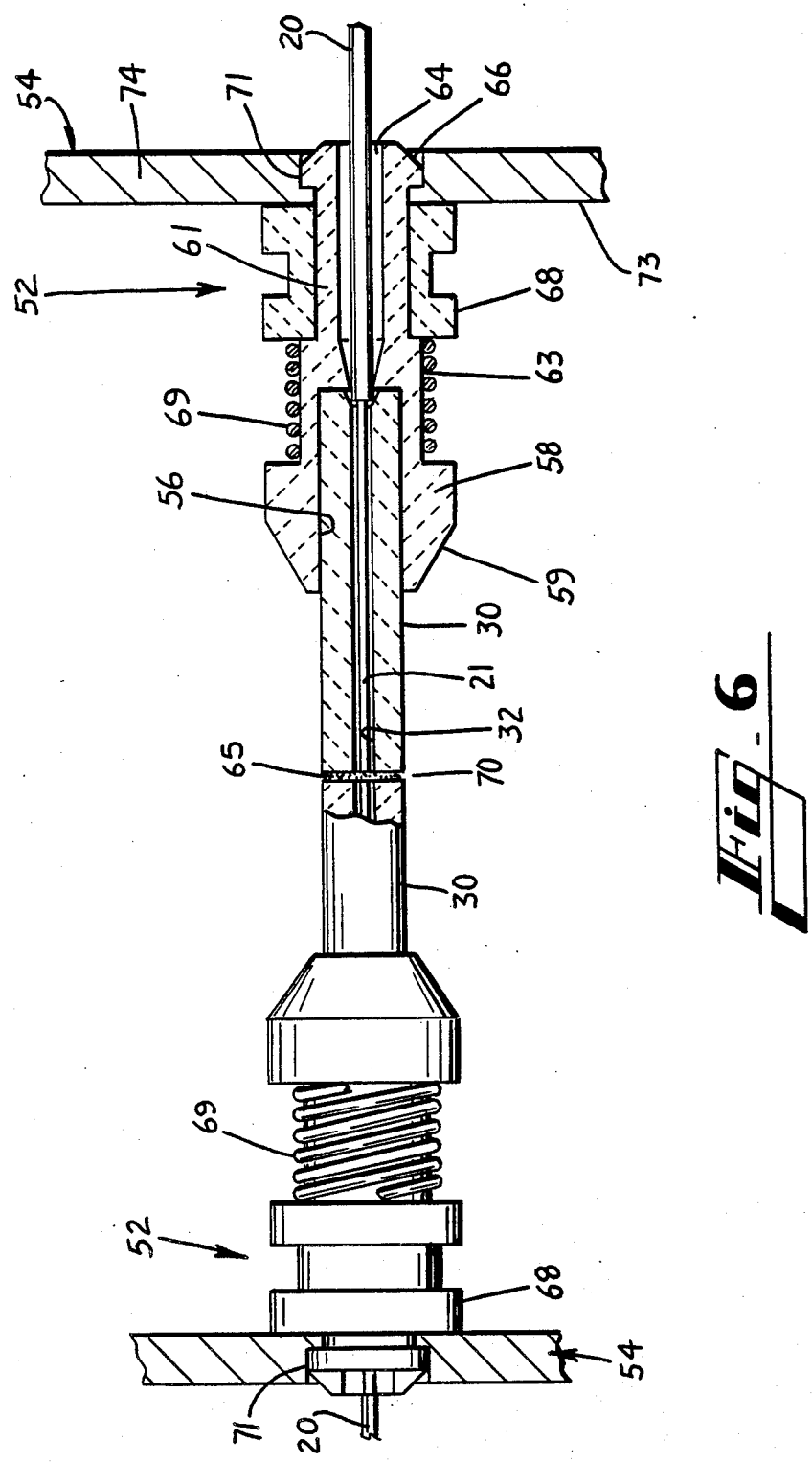
FIG. 6 shows a preferred embodiment of an optical fiber splice.

The following description relates to an optical fiber splice and to a method of making same. The splice can be used with both single mode and multimode optical fibers. However, maximum benefit is achieved with single mode fibers, because they have small core diameters, typically less than 15 microns which require precise alignment for low loss splices. The present splice does not rely on the use of fibers with well-centered cores. Alignment of fibers to be spliced is performed while monitoring light scattered from the splice to obtain best alignment of the cores themselves. This is complemented by the use of plugs which terminate the fibers and which hold adhesive material around the fiber ends. This allows a relatively small amount of a curable adhesive material to be used, improves thermal properties of the splice, and allows precise alignment before and during curing of the adhesive material. Also, this arrangement is less craft-sensitive than those of the prior art.

A coated lightguide or optical fiber 20 (see FIG. 1) to be spliced to another lightguide fiber includes a fiber 21 enclosed by a coating 22. The fiber 21 has a core 24 and a cladding 26. The clad fiber typically has a diameter of about 125 microns. Each fiber includes a longitudinal axis 28 which extends longitudinally through the core 24. The coated fiber 20 has an outer diameter of about 250 microns. The fiber 20 prepared for splicing has approximately 0.5 inch of the coating removed. Two similarly prepared fibers are spliced in accordance with this invention.

In order to splice the lightguide fibers 20—20, each is terminated with a terminus or plug 30 (see FIG. 2). The plug 30, which is cylindrically shaped, perferably is made of glass and has a length of about 0.5 inch and a diameter of about 0.1 inch. Also, the plug 30 has a preformed passageway 32 extending therethrough and having a diameter of about 5 mils which is sufficient so that a fiber may be positioned therein. Then the fiber 20 is secured within the plug 30. In a preferred embodiment, an adhesive material is applied to secure the fiber 20 to the plug 30. The fiber 20 is inserted into the passageway 32 of a plug 30 until its end face 34 extends slightly past an end face 36 of the plug.

After curing the adhesive material which secures the fiber 21 in the plug 30, a craftsperson polishes the end face 36 of the plug from which the fiber extends. This procedure is followed for each of two plugs 30—30 which terminate two coated fibers 20—20 that are to be spliced. Then the two plugs 30—30 are aligned axially and bonded together (see FIG. 3).

In order to accurately measure the proper alignment of the fibers, a scattered radiation detector 37 as shown in FIG. 4 is used. In the alignment operation, optical radiation is directed through one of the fibers 20—20 toward the splice. The optical radiation is usually, but not necessarily, at the operation wavelength of the fiber. It is applied conveniently at an accessible endpoint of the fiber. Alternatively, it may be inserted into the fiber by a coupler (not shown) at a point relatively nearer to the splice. If the cores 24—24 of the two fibers 21—21 are not aligned, a portion of the radiation is scattered into the cladding of the fiber, and from the cladding into the coating. If the coating is not opaque, a sufficiently sensitive detector can be used to monitor the scattered radiation. A suitable detector comprises a slotted tube 38 typically having a length of about 10 centimeters. The tube is placed around the fiber 20. For maximum sensitivity, the tube is filled with an index-matching material. Cargille index oil having a refractive index of 1.47 is satisfactory. The use of the matching fluid is not necessary in all cases, depending on the strength of the radiation in the fiber. A detector 40, for example an indium gallium arsenide detector for optical radiation having a wavelength of about 1.3 microns is positioned at the end of this tube, as shown in FIG. 4. It has been found that when the end of the slotted tube is perpendicular to the axis of the tube as shown, maximum scattered radiation pickup occurs. This is important in single mode optical fibers of long lengths, as the source of radiation may be at a considerable distance from the splice itself.

Two optical fibers 20—20 are terminated with plugs 30—30 as described hereinbefore and substantially flat end faces that are perpendicular to the respective axes of the fibers to within about 1 degree are polished. Referring to FIG. 5, one plug 30 is placed in a chuck 42 on a movable stage 43. A second plug 30 is similarly placed in a chuck 45 on a movable stage 46. Radiation at 1.3 micrometers is axially directed into the core of the first fiber and the scattering detector of FIG. 4 placed around the other fiber. The fibers 20—20 and plugs 30—30 are aligned initially with a microscope which allows the claddings of the fibers to be aligned. The ends of the plugs are separated about 25 microns at this point to allow for alignment. The scattering detector described hereinbefore is monitored to provide an initial alignment of the cores. The detector 40 sends a signal to an electrical control unit (not shown) to align automatically the fibers 20—20. The electrical control unit is available commerically. The electrical control unit controls stepper motors (not shown) which move the stages on which the chucks are supported in X-Y directions to align approximately the plugs fibers 20—20. The gap between the fiber ends is filled with a curable adhesive material 48 to provide a joint or bonding region 49. Then the apparatus automatically optimizes the core-to-core alignment of the fibers 20—20 to minimize the splice loss. After the fibers 20—20 have been aligned with the index matching adhesive material between their end faces, the adhesive material 48 is cured to lock in the alignment. This completes the splicing of the two fibers 20—20. Then the craftsperson removes the plugs 30—30 from the aforementioned apparatus. The apparatus which is used to align the fibers 20—20 is available commercially and is similar that used to align fibers for fusion splicing. An acceptable apparatus for this use is that manufactured by the AT&T Technologies, Inc. and designated "Bonded Splice Apparatus".

Although the curable adhesive material which forms the joint may be any one of several types, it has been found that an ultraviolet (UV) curable adhesive manufactured by American Chemical Engineering Company is especially suitable. The adhesive material has a tensile strength of at least 2,000 psi, and a refractive index of about 1.50. An improvement in the refractive index match between the fiber cores 24—24 due to adhesive material therebetween, as compared to an air gap, allows more precise alignment of the cores and reduces splice loss. In the plug 30, the curing of the adhesive material is accomplished with about a 366 nanometer wavelength radiation from a portable lamp. The adhesive material which is used to secure the fibers 21—21 within the plugs 30—30 need not be the same as that used to form the joint between the plugs.

The adhesive material which is interposed between the end faces 34—34 of the fibers 21—21 has a dual function. First, it must have suitable structural properties to hold the fibers 21—21 spliced together. Secondly, it has an index matching function. With regard to this last function, it has been found that a fiber to fiber joint having an air gap results in a loss of about 0.3 dB. By using an adhesive material having an index of refraction which is matched to that of the fibers, the loss is reduced to a mean of 0.05 dB.

Advantageously, the splice does not include any element that continues through the junction between the end faces 34—34 of the fibers 21—21. As a result, the interface between the fibers 21—21 is protected from stresses imparted thereto by temperature cycling by any element that extends through the interface. This is unlike prior art devices in which fibers were enclosed in sleeves or tubes that are continuous through the splice.

Going now to FIG. 6, there is shown the preferred embodiment of this invention. A device 50 for splicing two lightguide fibers 20—20 includes two compression assemblies 52—52 and a support frame or carrier 54. Each compression assembly 52 incudes a plug 30 having a passageway 32 formed therethrough. The plug 30 is adapted to be received in a cavity 56 of a body 58 of a housing 59. As can be seen in FIG. 6, the housing 59 also includes a stem 61 which extends from one end 63 of the housing. The stem 61 has a bore 64 extending therethrough and being aligned with the passageway 32 in the plug 30 and flange 66 at a free end thereof.

Each compression assembly 52 also includes a collar 68 which is slidably disposed about the stem 61 and which is adapted to engage the flange 66 in an unused condition. Further, a compression spring 69 is disposed slidably about the housing between the collar 68 and the body 58 of the housing 59.

In the use of the device 50, the craftsperson removes the coating 22 from about a half inch long end portion of the coated fiber 20. Then the craftsperson causes a curable adhesive to be moved into the passageway 32 of a compression assembly 52 and moves the fiber end portion into the bore 64 and passageway until its end face 34 extends slightly beyond the end face 36 of the plug 30. The craftsperson cures the adhesive material to secure the fiber to the assembly and polishes the end faces 34 and 36 of the fiber and plug. This procedure is repeated for another fiber and compression assembly 52 after which the two assemblies are positioned in the hereinbefore described apparatus for aligning coarsely the fiber cores. An index matching adhesive material 65 is disposed therebetween to form a joint 70. Afterwards the fiber cores 24—24 are aligned substantially precisely and the craftsperson causes the adhesive material to be cured to lock in the aligned cores.

Then the craftsperson removes the bonded compression assemblies 52—52 from the alignment apparatus and positions them in the support frame 54. This is accomplished by moving the collar 68 at one end toward the housing body 58 of that assembly to compress the spring 69. This allows the craftsperson to move the assemblies 52—52 to cause the flange 66 at the end of the stem 61 to be disposed in a nest 71 at one end of the support frame. Following this step, the craftsperson releases the collar 68 to allow the spring 69 to urge the collar into engagement with an inner face 73 of an end plate 74 of the support frame 54 to lock that assembly to the support frame. This procedure is repeated for the other compression assembly 52 to complete the splice assembly. In the alternative, a simple hand tool (not shown) may be used to compress simultaneously both springs and mount the assemblies 52—52 in the support frame.

The completed splice assembly is as shown in FIG. 6. Not only do the springs 69—69 urge the collars into engagement with the plates 74—74 of the carrier 54 to secure the compression assemblies 52—52 and carrier together, but they also prestress the joint between the fiber ends. The srings cause compression forces to be imparted to the joint. An order of magnitude of the spring force is about 100 grams which is sufficient to maintain the fibers 21—21 spliced together but which is not so high as to cause creep. Inasmuch as the joint is prestressed, temperature cycling does not affect the reliability of the splice. Further, no element of the splice 50 extends through the joint. As a result, unlike in prior art devices, there is no element which during termperature cycling imparts undue stresses to the joint.

The plug 30 preferably is made of quartz glass or of a material having a coefficient of expansion comparable to that of glass. This requirement matches the coefficient of expansion of the fiber 20 to that of the plug to reduce stresses on the joint. Further, the quartz glass is of help in the curing of the adhesive material in the passageways 32—32. Should the plug be made of an opaque material rather than glass or a similar material, the radiation flow through the plug is impeded.

The presence of a discontinuity of splice elements across the splice joint not only avoids thermal stressing of the joint by elements extending thereacross but also is advantageous with respect to alignment. During alignment of the cores of the fibers, the outer surface of the adjacent plugs may be misaligned axially. As a result, the alignment is not sensitive to the diameter of the plugs. Splices having sleeves or tubes continuous across the bonding region may unduly limit the alignment.

Also, inasmuch as the plugs 30—30 are cylindrical and provided with end faces 36—36 that are perpendicular to their longitudinal axes within close tolerances, cleaving of the fibers 21—21 is not required. This avoids the need for expensive equipment to perform the cleaving.

Loss measurements made during splicing in the field with the detector were recorded for 101 non-identical fiber splices and the results shown in the histogram of FIG. 7. The mean loss was 0.022 dB and the standard deviation was 0.029. In extended environmental testing of bonded splices which were made in accordance with this invention over a range of 40° C. to 77° C. in laboratory tests, the splice losses showed a mean variation of 0.02 dB during cycling with no net change after cycling.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber splice, which comprises:
   a first plug including a passageway which extends between end faces of said plug;
   a first optical fiber which comprises a core and a cladding about said core and which is secured in said passageway of said first plug with an end face of the fiber being substantially coplanar with one of the end faces of said first plug;
   a second plug including a passageway which extends between end faces of said second plug;
   a second optical fiber which comprises a core and a cladding about said core and which is secured in said passageway of said second plug with an end face of the second fiber being substantially coplanar with one of the end faces of said second plug, said one end face of said second plug being adjacent to said one end face of said first plug with the core of said second fiber being aligned substantially axially with the core of said first fiber; and
   a cured adhesive material which is interposed between the end faces of said fibers and between said one end face of said first plug and said one end face of said second plug to form a joint therebetween, said adhesive material having an index of refraction which is suitably matched to that of the fiber cores and being effective to hold said plugs and said fibers secured together and the cores maintained in alignment with each other, said splice being formed without any substrate that extends through a plane which is disposed between the end faces of the optical fibers and which is normal to longitudinal axes of the passageways.

2. The optical fiber splice of claim 1, wherein said adhesive is UV curable.

3. The optical fiber splice of claim 1, wherein the one end face of each plug is perpendicular to an axis to said each plug which extends along the passageway.

4. The optical fiber splice of claim 1, which also includes means for applying compressive forces in directions along the passageways to said joint.

5. The optical fiber splice of claim 4, wherein said splice is formed to include an axis of symmetry through said joint and perpendicular to the axes through said passageways, and wherein the forces are applied in a manner which avoids bending about the axis of symmetry.

6. A bonded optical fiber splice, which comprises:
   support means including spaced nests;
   first and second assemblies adapted to be held by said support means in alignment with each other, each of said assemblies terminating an optical fiber which comprises a core and a cladding and comprising:
   a plug which includes a passageway extending to an end face of the plug and having an optical fiber disposed in said passageway with an end face aligned with the end face of the plug, the end faces of the plugs being adjacent to each other and positioned with the core of one fiber being aligned with the core of the other fiber;
   a housing which includes a body having a cavity in which is received an end portion of the plug and a stem having a bore which is aligned with said passageway in said plug, said stem having a flange at a free and thereof with the flange being received in one of said nests of said support means;
   a collar which is disposed slidably about said stem, said collar engaging said support means adjacent to said nest in which said flange is received; and
   a compression spring which is disposed about said housing between said body of said housing and said collar and being effective to hold said collar in engagement with said support means to hold said assembly secured to said support means; and
   a cured adhesive material interposed between said end faces of said plugs to bond together said plugs and maintain said fibers in alignment with each other, said adhesive having an index of refraction suitably matched to that of the fibers to minimize the loss across said splice, the adhesive material being the only portion of the optical fiber splice that extends through a plane which is disposed between end faces of the optical fibers and which is normal to longitdinal axes of the passageways.

7. A method of splicing a first optical fiber having a core and a cladding to a second optical fiber having a core and a cladding, said method comprising the steps of:
   injecting a curable adhesive material into a passageway of each of two plugs;
   inserting the first optical fiber into the passageway of one of the plugs and the second optical fiber into the passageway of the other plug to cause end faces of the fibers to extend at least to end faces of the plugs;
   curing the adhesive material in each passageway to cause the fibers to be held in the plugs;
   polishing the end faces of the plugs and fibers;
   causing the end face of one plug to be adjacent to the end face of the other; and applying curable adhesive material to the opposing end faces of the plugs and fibers to form a joint therebetween, the adhesive material being the only portion of the splice that extends through a plane which is disposed between end faces of the fibers and which is normal to longitudinal axes of the passageways;

aligning the core of the first fiber with the core of the second fiber;

curing the adhesive between the end faces to lock the fibers in alignment with each other; and applying compressive forces to at least one plug to prestress the joint between the plugs.

8. The method of claim 7, wherein the fiber cores are aligned approximately after which the curable adhesive is applied between the adjacent end faces and the fiber cores aligned substantially precisely.

9. The method of claim 7, wherein each plug is made of quartz glass.

10. The method of claim 7, wherein the adhesive material is UV curable.

11. The method of claim 10, wherein cause copression forces are caused to be applied to the joint between the plugs to maintain the end faces bonded together and the fiber cores in alignment.

12. The method of claim 7, wherein each of said plugs is received in a cavity of a body of a housing which has a stem extending therefrom, the stem having a flange at one end thereof and a collar disposed about the stem and a spring about the housing, the spring being disposed between the housing body and the collar, and the method further including the step of moving the collar toward the body of the housing to compress the spring whereafter the flange of each stem is positioned in a nest of a support means and the spring released to cause the collar to engage the support means and secure the splice thereto.

13. A system for splicing optical fibers, said system comprising:

first and second assemblies each of which is capable of terminating an optical fiber and each of which includes:
a housing which includes a body and a stem extending from one end and having a bore formed therethrough for receiving an optical fiber and which includes an enlarged cavity that opens to another end and that communicates with said bore, said stem having a flange at a free end thereof:

a collar which is disposed slidably about said stem;

a compression spring which is disposed about said housing between said body and said collar; and a plug which is received in said cavity of said housing and which extends beyond the housing, said plug including a passageway therethrough for receiving an end portion of a fiber to be spliced, said passageway being aligned with the bore in said stem of said housing;

support means in which said assemblies are capable of being mounted with end faces of the plugs adjacent to each other, said support means having spaced apart nests for receiving said flanges of the stems with the spring of each assembly being such that when the collar is moved toward the housing thereof, a flange of the assembly is capable of being positioned in one of said nests and said collars released to urge ends of the plugs into compressive engagement with each other; and a curable adhesive which is adapted to be received in each said passageway prior to insertion of a fiber therein and between said adjacent end faces of said plugs, the adhesive in said passageways adapted to be used to secure the fibers within the passageways and that between said plugs to be used to lock the fiber cores in alignment with each other, the curable adhesive material being the only portion of said system that is adapted to extend through a plane which is disposed between the end faces of the optical fibers and which is normal to longitudinal axes of the passageways when said assemblies are mounted in said support means.

14. The system of claim 13, wherein said adhesive material has an index of refraction which is matched suitably to that of the fibers.

15. The system of claim 13, wherein said springs of said assemblies when mounted in said support means are capable of causing compressive forces of about 100 grams to be applied to the joint between the fiber ends.

* * * * *